Jan. 12, 1943. P. R. AUSTIN 2,307,817
POLYMERIC PRODUCT AND PROCESS
Filed Sept. 26, 1940 2 Sheets-Sheet 1
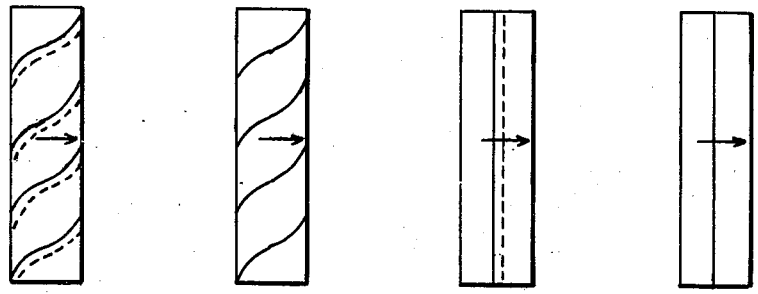
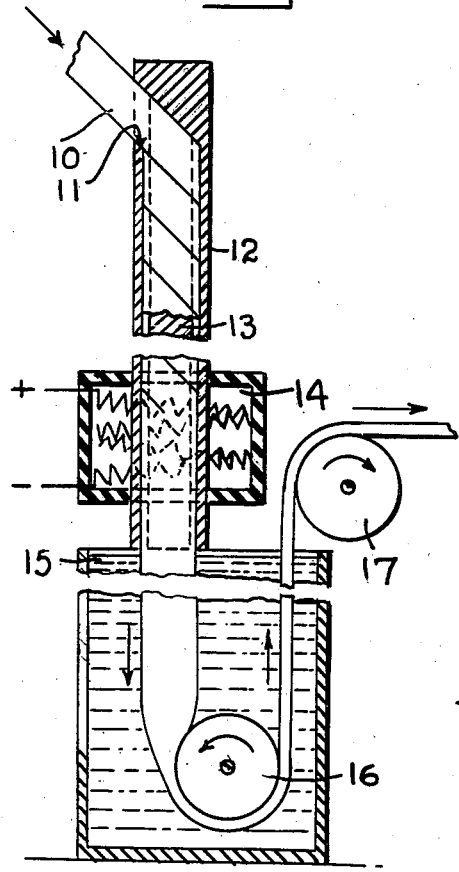
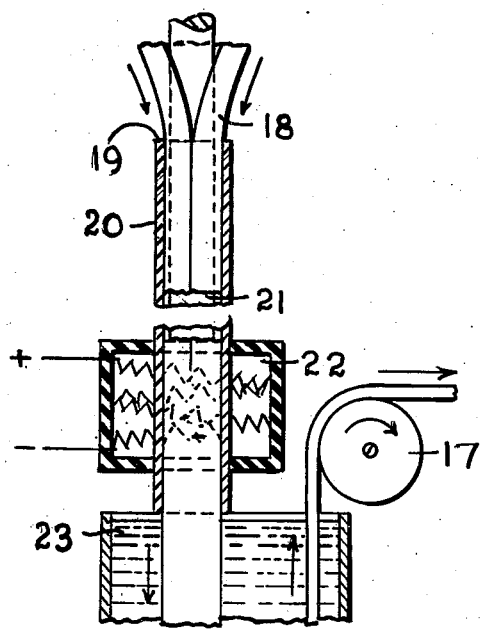
Inventor
Paul Rolland Austin
By Harold A. Jewett
Attorney Jan. 12, 1943.  P. R. AUSTIN  2,307,817
POLYMERIC PRODUCT AND PROCESS
Filed Sept. 26, 1940  2 Sheets-Sheet 2
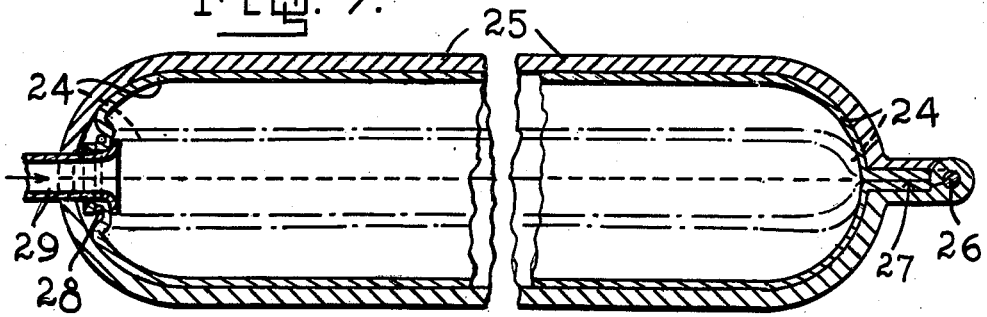
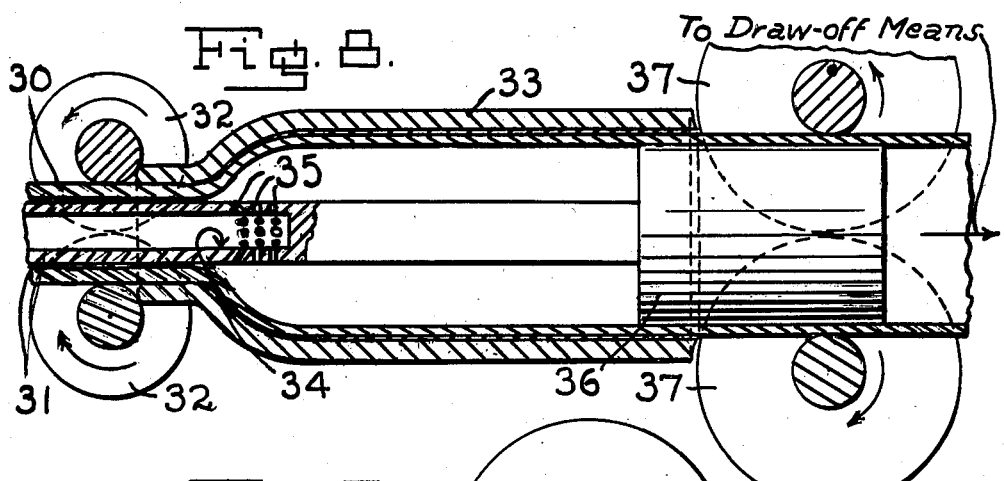
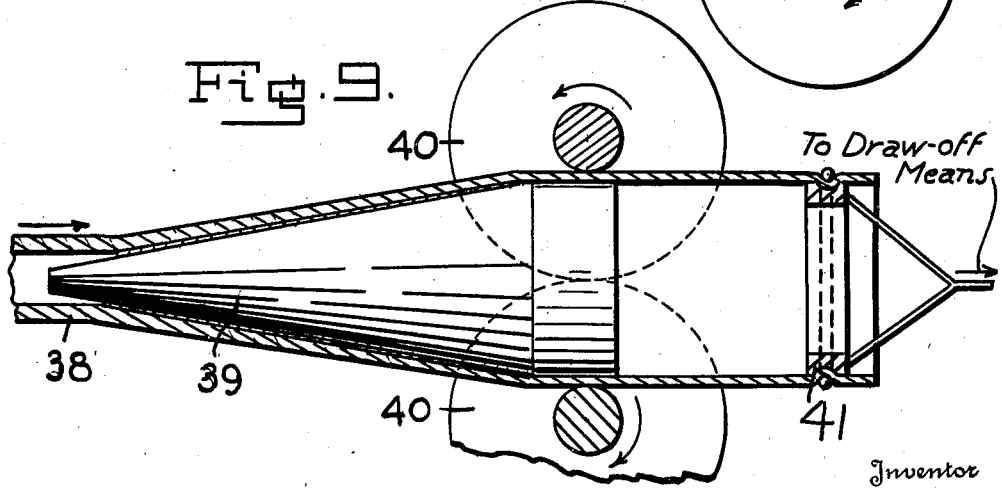
Inventor
Paul Rolland Austin
By Harold A. Jewett
Attorney Patented Jan. 12, 1943

2,307,817

UNITED STATES PATENT OFFICE 2,307,817

POLYMERIC PRODUCT AND PROCESS

Paul Rolland Austin, Wilmington, Del., assignor to E. I. du Pont de Nemours & Company, Wilmington, Del., a corporation of Delaware Application September 26, 1940, Serial No. 358,569

10 Claims. (Cl. 18—57)

This invention relates to the production of novel articles of manufacture, more particularly tubular conduits or containers. The generic term, tubing, will be employed hereinafter to designate the said articles of manufacture.

The use of rubber tubings or hose in place of metal conducting systems is well known, especially where the superior flexibility and lighter weight of rubber, as compared with metal, are desired. Rubber has certain serious disadvantages, however, such as comparatively low tensile and bursting strengths, and poor resistance to many chemicals; wherefore various plastics have been proposed for use in tubings and hose, in lieu of either rubber or metal. Particularly because of the low strength of the said plastics, however, there has persisted an acute need for tubing having strength approaching that of metals, combined with flexibility approaching that of rubber, as well as possessing good aging properties and satisfactory resistance to chemicals, to heat, and to repeated flexings.

Accordingly, this invention has as an object the production of tubing which will fulfill the said need. The invention also has as an object the production of such tubing having pre-determined directional strength characteristics, predetermined balance between circumferential and longitudinal resistance to stretching, and the achievement of such strength characteristics and such balance.

Generally speaking, these objectives together with others which will appear either expressly or impliedly hereinbelow, are accomplished by employing for, or as part of, the walls of the tubing a sheet, film, or lamina consisting essentially of synthetic linear polyamide of a type specified hereinafter, the said sheet, film or lamina being, or having been, cold-worked in such manner as to exhibit a kind and degree of orientation which will yield the aforesaid strength characteristics and the aforesaid balance in respect to resistance to stretching.

Without intending to be limited in any way by theoretical considerations as to the physical or chemical laws underlying the operativeness of the invention, applicant offers the following tentative observations with regard thereto, in order to facilitate a ready comprehension of the objectives and nature of the invention, as well as of the hereinafter described procedures for carrying the same into effect.

Orientation, as the term is employed herein, refers to the arrangement of the largest organized units of the polyamide structure. These largest units perhaps may be as small as single molecules or may be composed of crystals consisting of from few to many molecules. There are several types of orientation of these units. For instance:

(1) Where the units appear to be arranged parallel to each other and to face the same way, after the fashion of bricks in a wall.

This type of orientation seems to occur in polyamide films or tubings which have been cold-rolled in a single direction.

(2) Where the units appear to be arranged parallel to a line.

This type of orientation seems to be analogous to a group of pencils lying in a trough, and seems to occur in polyamide films or tubing which have been cold-drawn in a single direction.

(3) Where a crystallographic direction appears to lie at random in a plane.

This type of orientation seems to be analogous to a group of pencils lying on a table top with the longest direction parallel to the surface but with no other uniform arrangement, and seems to occur in polyamide film which has been cold-rolled in two directions, for instance in the manner described in Miles S. N. 170,470, now U. S. Patent No. 2,244,208, filed October 22, 1937, and assigned to the assignee hereof.

Synthetic linear polyamides are oriented by being subjected to external forces. The orientation is manifested by changes in the X-ray diffraction pattern, either in kind or in intensity, or in both. Usually the changes are indicated by the breaking of the sharp lines of the diffraction pattern of the unoriented polyamide into relatively short arcs. The development of orientation is accompanied by a considerable change in properties. When the orientation is such that a larger number of the long chains of the linear polyamide are disposed in a given direction, the tensile strength in that direction is increased.

The orientation of synthetic linear polyamide can be effected in several ways. In the case of sheeting, two of the most readily applied methods are: (1) cold drawing by elongating the sheeting to a substantial extent in one or more directions, and (2) cold rolling in one or more directions. As mentioned before, the type and degree of orientation determine the relative strength and resistance to stretching in various directions. In the practice of the invention, advantage is taken of this fact, to secure greater strength and decreased stretchability in tubing, in the desired direction. If the tube must withstand high bursting pressure, the orientation is effected in such a manner as to give a maximum number of the chains of polyamide a direction perpendicular to the axis of the tube and parallel to its surface. This objective may be accomplished by expanding the tubing radially or by winding helically a film in which most of the chains are arranged a suitable direction with respect to the length of the film. The relative degree of circumferential orientation then is determined, of course, by the directional characteristics of the orientation of the original film and the pitch of the helix, the strength and resistance to stretching in the circumferential and longitudinal directions being adjusted by regulating the relationship between the said characteristics and the said pitch.

One of the most important aspects of this invention, to be developed hereinbelow, involves novel methods and apparatus for imparting not only circumferential but also, in desired ratio thereto, longitudinal orientation to preformed unoriented tubing, whether of the helically or cylindrically wound type, with lap or butt-winding, or of the seamless variety.

The polyamides which are suitable for use in this invention are of the types described in U. S. P. 2,071,250, 2,071,253, 2,130,523, and 2,130,948. It may be observed, in passing, with respect to the structure of the polyamides, that they contain amide groups

where R is hydrogen or a monovalent hydrocarbon radical) as an integral part of the main chain of atoms in the polymer. It also may be observed that in these polyamides the average number of carbon atoms in the segments of the chain separating the amide groups is at least two. On hydrolysis with hydrochloric acid these polyamides yield an amine hydrochloride of the class consisting of amino acid hydrochlorides and diamine hydrochlorides. Accordingly, in this specification and the claims appended hereto, the expression, synthetic linear polyamide, is to be understood as applying to polyamides not only belonging to types described in the aforesaid patents, but also coming within the limitations pointed out in this paragraph.

Although certain of the advantages of the invention may be secured by starting with fully pre-oriented film and then fashioning the desired tubing therefrom, as, e. g., by wrapping it helically or cylindrically about a mandrel and effecting union at the lap portions or at the abutting edges in accordance with one of the procedures hereinafter set forth, the following description of this invention will be directed mainly to the preferred methods and apparatus for accomplishing the objects of the invention which involve operating upon tubing which has been preformed from an unoriented or partially oriented polyamide wall material.

Types of apparatus appropriate for the practice of the invention generally or of certain preferred embodiments thereof particularly are illustrated in the accompanying sketches.

The products

Fig. 1 shows helical lap-wound tubing, Fig. 2 helical butt-wound tubing, Fig. 3 cylindrical, non-helical, lap-wound tubing, and Fig. 4 cylindrical, non-helical, butt-wound tubing, as indicated by the direction of the arrows, these types of tubing are oriented circumferentially in a direction at right angles to the axis of the tubing. Union at the lap portions or abutting edges may be achieved by methods set forth hereinbelow.

No sketch of the seamless variety of tubing is presented. Such tubing may be produced by the solvent cast method described hereinbelow, or by extrusion or other methods such as described in Larchar S. N. 327,903, filed on April 4, 1940, and assigned to the assignee hereof.

The formation of the tubing

Fig. 5 shows apparatus appropriate for the manufacture of helical lap-, or butt-wound tubing such as shown in Figs. 1 and 2. Film or sheeting 10 is fed through slot 11, in film-confining jacket 12, about a lubricated stationary mandrel 13, axially disposed within the jacket 12, and passes between the mandrel and the jacket through a heating zone 14, wherein melting of the lap or seamed portions of the film is effected. The temperature in the heating zone, or oven, is maintained at a level near or slightly above the fusion point of the lap or seamed portions of the film, but below the fusion point of the rest of the film; the differential in the said melting points being achieved by incorporating with the polyamide at the said portions a melting point depresser, as for instance, a plasticizer which lowers the melting point of the polyamide. Immersion of the lap portions or seamed edges of the film in a solution of such a plasticizer, as, e. g., a saturated 50% aqueous ethyl alcohol solution of phenol, will suffice to effect the said incorporation.

On emerging from the heating zone 14 the tubing passes into a cooling zone 15, which may be a quench bath consisting of an inert liquid such as water, and in which rapid solidification of the melted polyamide is brought about. Thence, the tubing is drawn away by suitable take-off means, such as rollers 16 and 17. Orientation subsequently may be imparted to the lap or seamed portions, or to the entire wall structure if it was formed with unoriented film, by methods hereinafter described.

The apparatus shown in Fig. 6 is analagous to that shown in Fig. 5, except that it is used for the formation of cylindrically wound tubing rather than helically wound tubing. The film 18 is introduced into the open end 19 of a film-confining jacket 20 which is disposed about the film supporting mandrel 21. From the heating zone 22, where fusion at the lap or seamed areas may be accomplished as already explained in connection with Fig. 5, the tubing passes into cooling zone 23, where it is quenched and drawn away in the same manner as described with respect to Fig. 5.

The orientation of pre-formed tubing

Fig. 7 depicts a special form of apparatus for circumferentially stretching stationary tubing. The tubing 24 is placed inside an expansion-limiting metal cylinder 25, the upper half of which cylinder conveniently may be hinged, as at 26, in order to permit opening thereof and thus to facilitate insertion of the tubing into the cylinder, or removal of the tubing therefrom. One end of the tubing is closed, e. g., by being clamped in a recess 27, while the other or open end of the tubing optionally may be secured by a ring clamp 28. Pressured gas such as air then is introduced into the interior of the tubing through the conduit 29. Longitudinal stretching is precluded, since the cylinder is of approximately the same length as the initial tubing. The length of the cylinder of course may be increased so as to permit longitudinal, as well as circumferential, stretching, and the diameter of the cylinder of course may be made larger or smaller, depending on the desired ratio between circumferential and longitudinal orientation.

Fig. 8 illustrates apparatus appropriate for continuously effecting circumferential expansion by gas pressure, of tubing moving in the direction of its longitudinal axis. Prior to expansion the tubing 30 may be propelled along a lubricated interiorly supporting mandrel 31 by feed rollers 32. These rollers may be recessed so that each fits snugly about 180° of the cylindrical exterior of the tubing. As the tubing passes beyond the rollers it enters a lubricated expansion-limiting cylindrical casing 33, which preferably has gradually divergent walls. Pressured gas, fed through a conduit 34 which is coaxial with the mandrel, issues from ducts 35, thus producing superatmospheric pressure interiorly of the tubing, and expanding the same into contact with the divergent walls of the casing.

Disposed within the casing, at its opposite end, is a lubricated cylindrical shaped closure element 36, which is of sufficient diameter to furnish interior support for the tubing, while nevertheless permitting clearance for the tubing without its binding against the inner wall of the casing. Draw-off means 37, which may be rollers recessed similarly to rollers 32, then propel the expanded tubing to its next destination. Excess pressure within the casing may be relieved by conventional means, as, e. g., a safety valve in the closure element 36.

It will readily be seen, from the foregoing description, that suitable regulation of the speed of draw-off means 37 with respect to the feed rollers 32 will suffice to impart whatever longitudinal stretching may be desired, in supplementation of the already effected circumferential stretching.

Fig. 9 illustrates a further type of apparatus by means of which circumferential orientation, together with concomitant longitudinal orientation, may be effected. Tubing 38 is pulled over an object 39, which may be a truncated cone, a hemisphere, or other like object, and which has an appropriately lubricated exterior surface. The said object 39 is disposed axially in line with the continuously moving tubing 38, and the propulsion of the tubing conveniently may be effected or aided by means of the recessed rollers 40. The maximum cross-section of the object 39 is made larger than that of the initial diameter of the tubing, but preferably not more than 10–20% larger, the drawing being exaggerative in this respect, for purposes of illustration. An annular clamp 41, fastened to the forward end of the tubing, is connected to a draw-off mechanism and is employed to pull the tubing at a uniform rate over the object 39.

The procedure just described is repeated with other objects similar to 39 but having successively larger cross-sections, whereby the expansion and longitudinal stretching are effected in a stage-wise manner, the intervals between the successive stages serving to permit relaxation of the tubing. Such stage-wise procedure and intermittent relaxation, as stated more fully hereinbelow, are of advantage not only when the apparatus of Fig. 9 is employed, but also when gas expansion is utilized. Special benefits from the use of such procedure follow where gas expansion modes of practicing the invention are employed. These benefits will be detailed hereinbelow.

In a preferred embodiment of the process of the invention cone-drawing is employed in the first instance, followed by the use of gas expansion for the completion of the orientation. This procedure has the advantage that the factor of longitudinal stretching necessary for pulling the tubing over the cone is sufficiently great to eliminate any need, in the usual case, for making provision for further longitudinal stretching in connection with the subsequent expansion by gas. An additional advantage in this procedure is that it reduces very materially the amount of gas pressure which must be maintained. Consequently, the outlays necessary for high-pressured gas equipment are substantially reduced. In explanation of this last-mentioned advantage, the following analysis is presented:

When expansion by gas or fluid pressure is preceded by preliminary expansion, e. g., by pulling the tubing over a cone—any expansion of the tubing necessarily resulting in thinning, and consequently weakening, the walls—the gas or fluid pressure required for further expansion may be represented by the formula $$P = k\frac{P_o C_o}{C}$$

wherein $C_o$ = circumference of tubing before being expanded through mechanical means
$P_o$ = gas or fluid pressure necessary to produce expansion of tubing for circumference $C_o$
$C$ = circumference of tubing after being expanded through mechanical means
$P$ = gas or fluid pressure necessary to produce expansion of tubing of circumference $C$
$k$ = a numerical constant.

From the foregoing formula it can readily be seen that if tubing of a given original circumference is expanded 50%, e. g., circumferentially, by passing over a cone or analogous physical obstruction, the gas or fluid pressure then necessary to bring about further expansion will be only ⅔ as much—barring internal changes in the inherent nature of the material of the tubing—as that which would have been necessary to expand the tubing in the first instance, that is, when its circumference was $C_o$.

Particular illustrations of the application of the foregoing methods are presented in the following examples:

EXAMPLE I

Hexamethylene adipamide is prepared and formed into film as described in U. S. P. 2,130,948. This film then is cold-rolled to 350% of its original length. The film now has a thickness of 0.005″ and shows a high degree of orientation, by X-ray examination. Lengths of the film are lap-wound about a cylindrical form, the helices making a 45° angle with the axis of the form. Solvent, consisting of 60 parts of anhydrous formic acid, 20 parts of octyl phenol and 20 parts of acetone, is applied to the areas contacting each other at the lap portions. The film is clamped so that intimate contact between these layers is secured and the whole is heated at 110° C. The tubing then is removed from the form. Such tubing has greater clarity and pliability than tubing prepared from film which has not been oriented, and has tensile and bursting strengths of 130 lbs. and 525 lbs./in.$^2$, respectively, as compared with 69 lbs. and 186 lbs./in.$^2$, respectively for unoriented tubing. In this instance, the helical seam serves to increase the resistance of the tubing to bending or to being collapsed by external pressure.

EXAMPLE II

Polymer is prepared from 1200 parts of hexamethylene diammonium adipate and 800 parts of caprolactam by the general method described in U. S. P. 2,130,948. Eighty-four parts of this polymer is dissolved in 1000 parts of chloroform and 266 parts of methanol. A cylindrical form is immersed in this solution, is raised end-wise from the solution and is allowed to dry in a vertical position for thirty minutes at normal room conditions. The coated form is again immersed in the solution and this time is allowed to drain toward the end which was uppermost when the first coat was applied. Six such coats are put on, the solution being drained alternately from one end of the form and then from the other. After the last coating has been applied, the polymer is dried thoroughly by warming at 60° C. for thirty minutes, whereupon the tubing is stripped from the form.

Next, the tubing is expanded by means of apparatus such as shown in Fig. 7, from an internal diameter of ½" to an internal diameter of ¾", without increase in length of the tubing. The tubing so expanded has approximately 50% greater bursting strength, per unit of wall thickness, than it had prior to the expansion.

EXAMPLE III

Tubing prepared as in Example II, and having ½" internal diameter and 0.010" wall thickness, is surrounded by a metal cylinder having an internal diameter of 21/32". This cylinder is similar to that shown in Fig. 7, except that its length is not limited to that of the initial tubing, i. e., it is about 2½ times as long. On introduction of pressured gas into the interior of the tubing, it is expanded to the diameter of the cylinder. The tubing so expanded now is placed within a metal cylinder having an internal diameter of 25/32", and is expanded to fill this cylinder. By similar successive steps, the tubing is expanded to fill cylinders having internal diameters, respectively, of 28/32", 1" and 1¼". On release of the pressure, after expansion of the tubing to 1¼" diameter, the tubing contracts to a diameter of approximately 1".

During the foregoing stage-wise procedure, the length as well as the diameter of the tubing increases about 100% and the orientation of the walls becomes distinctly apparent, on X-ray diffraction examination. Such tubing has a bursting strength of 10 lbs./sq. in. internal pressure per 0.001" wall thickness when wet, as compared with 4 lbs./sq. in. internal pressure per 0.001" wall thickness for unoriented web tubing of the same composition and internal diameter. These data become very significant when compared with the bursting strength of standard carbon-filled vulcanized rubber tubing of the same internal diameter, which bursting strength is only 0.2 lb./sq. in. per 0.001" wall thickness.

EXAMPLE IV

Tubing having the same composition as that of Example III, and also having the same internal diameter and wall thickness, i. e., ½" and 0.010", respectivley, is drawn over a cone having a height of 1¼" and a diameter across the base of ¾", in a manner similar to that illustrated in Fig. 9. Pulling the tubing over this cone results in cold-drawing the polymer to an increase in circumference of 50%, the pulling force necessary to draw the tubing over the core causing an extension of the tubing lengthwise to about 400% of its initial length. X-ray diffraction patterns now clearly evidence the orientation. The pliability and both the bursting and tensile strengths per unit of wall thickness of the tubing are greatly increased, as compared with those of the tubing prior to the cone-stretching.

In the case of the butt-wound or lap-wound products, whether helically or cylindrically wrapped, the union at the seams or lap portions conveniently may be effected by first disposing pre-formed film or sheeting about a temporary mandrel, next setting the film in its wound-up state by heating it in the presence of a mild non-solvent swelling agent, as, e. g., in the manner described in Miles U. S. P. 2,157,119, and then applying a solvent for the polyamide, or other adhesive medium therefor. Tubing can also be made by bringing the edges of the preformed ribbon or sheeting together continuously and passing the seams first between hot rolls and then between cold rolls; or over a mandrel, first under a hot roll and then under a cold roll, the mandrel or one pair of rolls being supported back of the point where the edges of the sheeting are brought together.

A further variation of method for effecting the aforesaid union, in instances where fusion is preferred, consists in disposing the helically or cylindrically wound film about a mandrel which is constructed with strips of magnetic metal so designed as to coincide with the helical contactive portions or areas, if the film has been spirally wound, or with the straight contactive portions or areas, if the film has been non-helically wound. Localized heating to temperatures above the melting point of the polyamide, even if no melting point depressor is employed, easily can be effected with such an arrangement, by conventional electrical induction methods. That is, on induction heating of the said magnetic strips, while insulating the same from the rest of the mandrel in order to avoid the heating of the latter, only the lap or seamed portions of the tubing are fused.

In any case where union is effected by melting followed by solidification whatever orientation may have existed prior thereto is destroyed in the portions which have been melted. And in the case of lap-wound tubing, if the thickness of the film or sheeting in the lap portions has not been reduced prior to formation of the tubing, the doubled thickness at the laps nevertheless serves to make up for the strength lost due to the destruction of the orientation in the lap areas. In consequence, however, increased rigidity exists at those areas. And where the lap portions of the film or sheeting have been reduced approximately 50% in thickness, prior to being lap-wound, in order to yield a lap wound tubing having uniform wall thickness throughout, or where butt-winding is employed, not only is there no increase of strength due to over-all wall thickness, but the relative strength at the lap or seamed portions is reduced to a minimum. These considerations make it advisable, in the usual case, to commence with unoriented film or sheeting, where helically or cylindrically wound tubing is desired. Subsequent expansion of tubing so formed, after fusion sealing—or, as well, after sealing by, other methods—at the laps or seams, appears to strengthen the union by effecting orientation of the walls at the lap areas or the seams.

It is to be noted not only that a different type of orientation is produced when compressive stress, as distinguished from tensile stress, is employed, but that the cold-rolled products generally are more uniform in their properties than the cold-drawn products. Unless the cold-drawing has been conducted at elevated temperatures or has been continued until a state of substantially complete orientation has been reached, there characteristically are alternate areas of undrawn and completely drawn polymer; whereas, in the case of cold-rolling, the orientation is uniform regardless of the degree of rolling. For this reason, it often is preferred to accomplish the orientation of pre-formed tubing, in accordance with the invention, by employing in place of procedures and apparatus represented by Figs. 7-9, squeeze-rolling of the flattened tubing. By imparting suitable pressure to such rollers the circumference of the tubing can be greatly increased, with consequent increase of orientation.

In this connection, it may be observed that it is surprising that the creasing of the tubing, due to its being flattened and squeezed between the rollers, seems generally not to be detrimental, insofar as many uses for the tubing are concerned. When this procedure is adopted, it is advisable to roll an equal amount in opposite directions.

Of course, where the foregoing squeeze roller procedure is adopted, longitudinal orientation may be effected in conjunction with the circumferential orientation, by rolling in the longitudinal direction. Or, the rolling may also be done in oblique directions.

The alternation of undrawn and completely drawn areas, which characteristically exist during the earlier stages of cold-drawing, presents a special difficulty where gas expansion stretching is employed. That is, since circumferential stretching results in a lowering of the pressure necessary for further circumferential stretching, there is a tendency for the tubing to blow out at the completely drawn areas, rather than to stretch at the undrawn areas. This tendency is minimized, however, by the stage-wise procedure described hereinabove, thus yielding the special benefits already alluded to, with regard to the cases where gas expansion exclusively is employed. Resort to cone-drawing for accomplishing the earlier fractions of the stretching serves to obviate the difficulty in question, by virtue of the uniformity of expansion which it effects, but the unavoidably high degree of longitudinal stretching which goes with the cone-drawing makes resort to that procedure prohibitive in those instances where a relatively low degree of longitudinal orientation, together with a relatively high degree of circumferential orientation, is desired.

With regard to the achievement of a desired balance between circumferential and longitudinal orientation, whether with reference to cone-drawing or other types of procedures, it should be borne in mind that orientation in any one direction operates to lessen the amount of orientation which thereafter can be effected in a different direction. The optimum balance, in such respect, for the tubing of the invention, has been found in general to be that which exists when a longitudinal increase of 50% has been effected, together with as much circumferential increase as is practically possible therewith. A circumferential increase of at least 50% is desirable. The principal advantages of the said balance are due in part, presumably, to the fact that for a given degree of internal pressure, the amount of circumferential stress which closed tubing must withstand is about twice the amount of the axial stress which is exerted upon it.

Where pre-oriented film or sheeting is used for the production of helical tubing, the angle of the orientation with the axis of the tubing may be adjusted, as pointed out hereinabove, by regulating the pitch of the helices and the angle between the axis of the film and its direction of orientation. In other words, if $x$ represents the angle between the axis of the film and the axis of the tubing in Fig. 1, e. g., and $y$ represents the angle between the axis of the film and the direction of orientation, the maximum circumferential direction of orientation for the finished tubing will be obtained when $x$ plus $y$ equals 90°, as indicated by the arrow in Fig. 1.

The broad invention may be applied to the construction of tubes having laminated or complex wall structures, as well as to the varieties of tubing described hereinabove. Thus, one lamina may be of fabric, with seamless tubing or one or more of the types of tubing depicted in Figs. 1-4 superimposed thereover or thereunder, or both. Or, a composite wall structure comprising such tubing may be furnished supplementary support against the effect of external pressure, by means of a re-enforcing coil of wire. A particularly valuable type of laminated wall structure, wherein tubing manufactured in accordance with the invention is employed for each of its two laminae, is that which is made up as follows:

Seamless polyamide tubing is elongated 200-400% by longitudinal stretching. Over this tubing, the same being interiorly supported by a mandrel, there then is placed a helically-butt-wound tubing wherein the sum of the aforesaid angles, $x$ and $y$, equals 90°. Sealing of the tube laminae—effected, e. g., by the use of solvent plus heat and pressure—yields a laminated tubing having uniform wall thickness throughout, and having maximum strength and stretch-resistance characteristics both longitudinally and circumferentially.

Instead of the polyamides mentioned hereinabove, which are obtainable from bifunctional polyamide-forming reactants alone, there also may be used linear polyamides which are obtained by including with the polyamide-forming reactants other bifunctional reactants, such as amino alcohols and hydroxy acids. Notwithstanding the fact that these products contain ester linkages, they still may be referred to as polyamides, since they contain a plurality of amide linkages in the main chain and retain many of the desirable properties of the simple polyamides. In general these polyester-amides, like the simple synthetic linear polyamides, do not possess fiber- or film-forming properties unless they have an intrinsic viscosity above 0.4, where intrinsic viscosity is defined as in U. S. P. 2,130,948. Polyamides having an intrinsic viscosity between 0.6 and 2.0 are particularly suitable for use in the practice of this invention.

In many instances it is advantageous to use modified polyamides. For example, plasticizers, fillers, dyes, or pigments may be incorporated to alter pliability, increase abrasion resistance, decrease the cost of the product, or change its appearance. Non-heat hardening phenolic resins may be added to alter orientability, stiffness, translucency, heat resistance, or solvent sensitivity.

Because of the outstanding resistance of the polyamides to solvents and moisture, the tubing of the invention is especially suitable for conducting such substances as aromatic or halogenated hydrocarbons, particularly at elevated temperatures. On this score it is to be observed, also, that the oriented tubings have considerably greater resistance to thermal degradation than such tubings which have not been oriented.

A further great advantage of the tubings of the invention consists in the fact that their remarkable strength, which is about 50 times that of good grade vulcanized rubber tubing of the same dimensions, and appreciably greater than that of the limited number of conventional "plastic" tubings, makes them superlatively qualified for use as conduits or containers that need to possess great strength. For instance, where prior art methods have required drilling out the central portions of rods, in order to obtain relatively thick walled tubing of adequate strength, it often is possible to substitute for such methods and such products, the procedure and products of this invention, thereby effecting new economies of great importance.

Since many apparently widely different embodiments of this invention may be made without departing from the spirit and scope thereof, it is to be understood that I do not limit myself to the specific embodiments thereof except as defined in the appended claims.

I claim:

1. The method of producing a tubing of synthetic linear polyamide having, in desired degree, pre-determined directional orientation characteristics, which method comprises subjecting a tubing of orientable synthetic linear polyamide, in a substantially non-gelatinous solid state, to an interiorly applied radially substantially uniform expansive force, then permitting the expanded tubing to relax, subsequently re-subjecting the tubing to an interiorly applied expansive force, again permitting the tubing to relax, and terminating this stage-wise procedure when the desired degree of circumferential expansion has been achieved.

2. The method of claim 1 wherein at least part of the total expansion is effected by drawing the tubing over an obstacle whose greatest cross-sectional area at right angles to the axis of the tubing corresponds in peripheral configuration to that of the tubing, and in which the said area exceeds, by at least 125%, the area defined by a cross-section of the tubing.

3. The method of claim 1 wherein the expansion is substantially totally effected by subjecting the tubing to an interiorly applied pressured fluid.

4. The method of producing a tubing of synthetic linear polyamide having, in desired degree, pre-determined directional orientation characteristics, which method comprises drawing a tubing of orientable synthetic linear polyamide, in a substantially non-gelatinous solid state, over an obstacle whose greatest cross-sectional area at right angles to the axis of the tubing corresponds in peripheral configuration to that of the tubing and in which the said area exceeds the area defined by a cross-section of the tubing, thereupon permitting the tubing to relax, and thereafter increasing the orientation of the tubing by applying pressured fluid interiorly of the tubing to accomplish substantially solely circumferential further stretching of the tubing.

5. Tubing of synthetic linear polyamide in which the walls of said tubing exhibit by X-ray diffraction patterns circumferential orientation, said tubing having a substantially increased wet bursting strength over the unoriented tubing and being obtainable by subjecting a tubing of orientable synthetic linear polyamide, in a substantially solid state, to stretching by an interiorly applied expansive force until the circumference of said tubing is increased at least 50% thereby producing a substantial degree of circumferential orientation in said tubing.

6. Tubing of synthetic linear polyamide in which the walls of said tubing exhibit by X-ray diffraction patterns circumferential orientation, said tubing having a substantially increased wet bursting strength over the unoriented tubing and being obtainable by subjecting a tubing of orientable synthetic linear polyamide, in a substantially solid state, to stretching by an interiorly applied pressured fluid until the circumference of said tubing is increased at least 50% thereby producing a substantial degree of circumferential orientation in said tubing.

7. Tubing of synthetic linear polyamide in which the walls of said tubing exhibit by X-ray diffraction patterns circumferential orientation, said tubing having a substantially increased wet bursting strength over the unoriented tubing and being obtainable by subjecting a tubing of orientable synthetic linear polyamide, in a substantially solid state, to stretching by drawing said tubing over an obstacle whose greatest cross-sectional area at right angles to the axis of the tubing corresponds in peripheral configuration to that of the tubing and in which the said area is sufficient to increase the circumference of said tubing at least 50% thus producing a substantial degree of circumferential orientation in said tubing.

8. Tubing of synthetic linear polyamide in which the walls of said tubing exhibit by X-ray diffraction patterns circumferential and longitudinal orientation, said tubing having a substantially increased wet bursting strength over the unoriented tubing and being obtainable by subjecting a tubing of orientable synthetic linear polyamide, in a substantially solid state, to stretching simultaneously in both longitudinal and circumferential directions by an interiorly applied expansive force until the circumference of said tubing is increased at least 50% thereby producing a substantial degree of circumferential orientation in said tubing.

9. Tubing of synthetic linear polyamide in which the walls of said tubing exhibit by X-ray diffraction patterns circumferential and longitudinal orientation, said tubing having a substantially increased wet bursting strength over the unoriented tubing and being obtainable by subjecting a tubing of orientable synthetic linear polyamide, in a substantially solid state, to stretching by an interiorly applied expansive force until the circumference and length of said tubing are both increased at least 50% thereby producing a substantial degree of circumferential and longitudinal orientation in said tubing.

10. The tubing of synthetic linear polyamide as set forth in claim 8 in which the degree of circumferential orientation in the walls of said tubing exceeds the degree of longitudinal orientation therein.

PAUL ROLLAND AUSTIN.